United States Patent
Zoso et al.

(10) Patent No.: US 10,850,388 B2
(45) Date of Patent: Dec. 1, 2020

(54) EXOSKELETON SUB-ASSEMBLY AND EXOSKELETON STRUCTURE INCLUDING SUCH A SUB-ASSEMBLY

(71) Applicants: SAFRAN ELECTRONICS & DEFENSE, Boulogne-Billancourt (FR); B-TEMIA INC., Québec (CA)

(72) Inventors: Nathaniel Zoso, Québec (CA); Francisco Soucy, Québec (CA); Jordane Grenier, Boulogne-Billancourt (FR); Jonathan Baptista, Boulogne-Billancourt (FR); Katia Bilodeau, Québec (CA)

(73) Assignees: SAFRAN ELECTRONICS & DEFENSE, Boulogne-Billancourt (FR); B-TEMIA INC., Québec (CA)

( * ) Notice: Subject to any disclaimer, the term of this patent is extended or adjusted under 35 U.S.C. 154(b) by 0 days.

(21) Appl. No.: 16/474,839

(22) PCT Filed: Dec. 28, 2017

(86) PCT No.: PCT/EP2017/084743
§ 371 (c)(1),
(2) Date: Jun. 28, 2019

(87) PCT Pub. No.: WO2018/122331
PCT Pub. Date: Jul. 5, 2018

(65) Prior Publication Data
US 2019/0344435 A1    Nov. 14, 2019

(30) Foreign Application Priority Data

Dec. 29, 2016  (FR) ...................... 16 63510

(51) Int. Cl.
*B25J 9/00*    (2006.01)
*A61H 3/00*    (2006.01)

(52) U.S. Cl.
CPC .............. *B25J 9/0006* (2013.01); *A61H 3/00* (2013.01); *A61H 2003/007* (2013.01);
(Continued)

(58) Field of Classification Search
CPC .... B25J 9/0006; A61H 3/00; A61H 2003/007; A61H 1/0262; A61H 2201/165;
(Continued)

(56) References Cited

U.S. PATENT DOCUMENTS

2016/0184111 A1    6/2016  Ikedo et al.
2018/0160946 A1*   6/2018  Macko ................. A61B 5/4528

FOREIGN PATENT DOCUMENTS

| EP | 1 905 407 A1 | 4/2008 |
| EP | 2 942 044 A2 | 11/2015 |
| EP | 2 942 044 A3 | 1/2016 |

OTHER PUBLICATIONS

International Search Report for PCT/EP2017/084743 dated Apr. 9, 2018 (PCT/ISA/210).
(Continued)

*Primary Examiner* — Brian A Dukert
*Assistant Examiner* — Rebecca Lynee Zimmerman
(74) *Attorney, Agent, or Firm* — Sughrue Mion, PLLC

(57) ABSTRACT

The invention relates to an exoskeleton sub-assembly (30) comprising: —a leg part (32) to be attached to a leg of a user, and—a foot part (33) to be attached to a shoe of the user; the leg part (32) comprises a tibial segment (321) extending below the knee, along the tibia of the user, when the leg part (32) is attached to the leg, and the tibial segment (321) comprises a first component (325), a second component (326) connected to the foot part (33), and a first joint (327) connecting the second component (326) to the first component (325), the first joint (327) permitting a rotation of the second component (326) with respect to the first component
(Continued)

US 10,850,388 B2

Page 2

Figure 1:
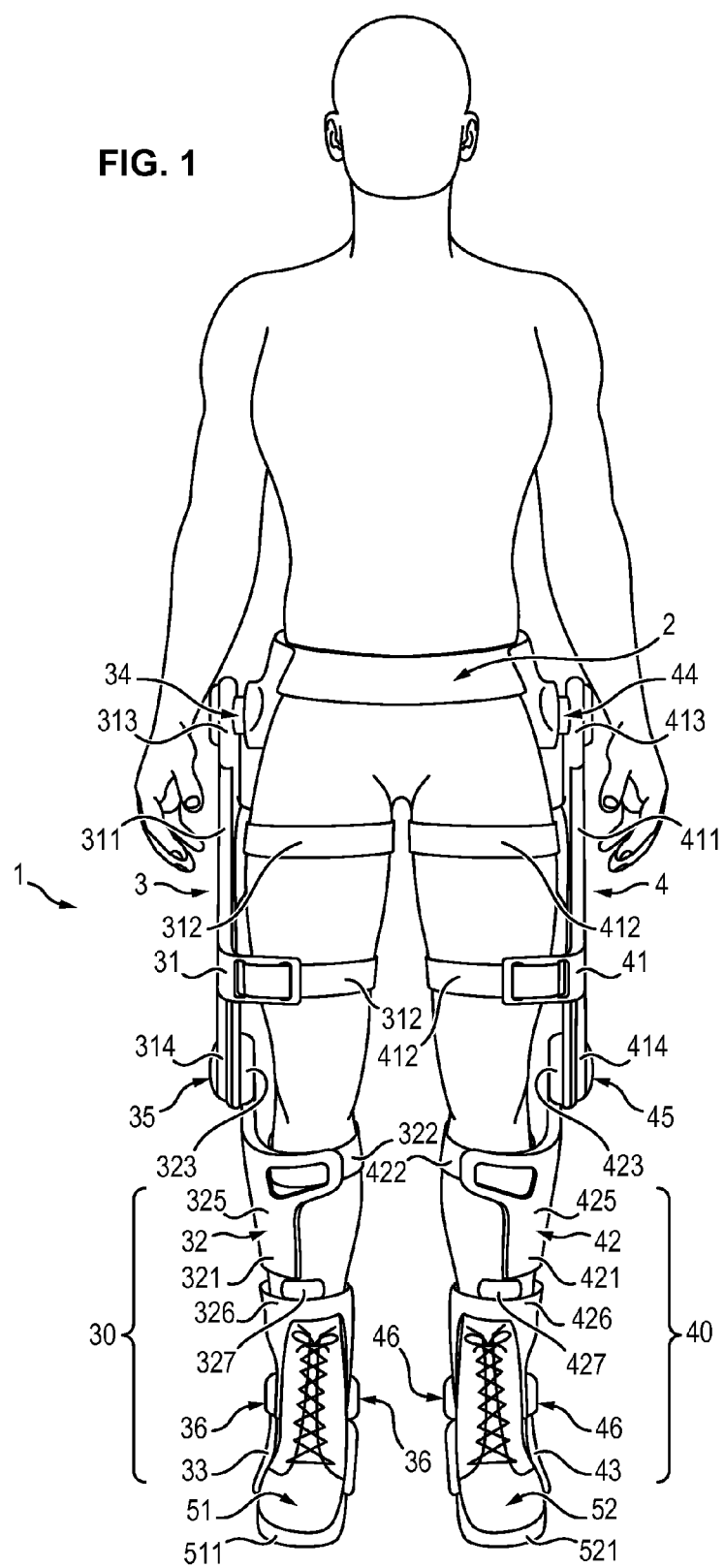

(325) caused by an internal or external rotation of the user's foot with respect to the leg.

6 Claims, 5 Drawing Sheets

(52) U.S. Cl.
CPC ............... *A61H 2201/0107* (2013.01); *A61H 2201/165* (2013.01); *A61H 2201/1642* (2013.01); *A61H 2201/1673* (2013.01); *A61H 2201/1676* (2013.01)

(58) Field of Classification Search
CPC ..... A61H 1/0266; A61H 2205/12; A61F 5/01; A61F 5/0111; A61F 5/0113; G05B 2219/40305; A63B 21/4015; A61B 5/6829; A61B 5/0113
See application file for complete search history.

(56) References Cited

OTHER PUBLICATIONS

Search Report from the French Patent Office in counterpart application No. 1663510 dated Oct. 12, 2017.
Written Opinion in International Application No. PCT/EP2017/084743, dated Apr. 9, 2018.

\* cited by examiner

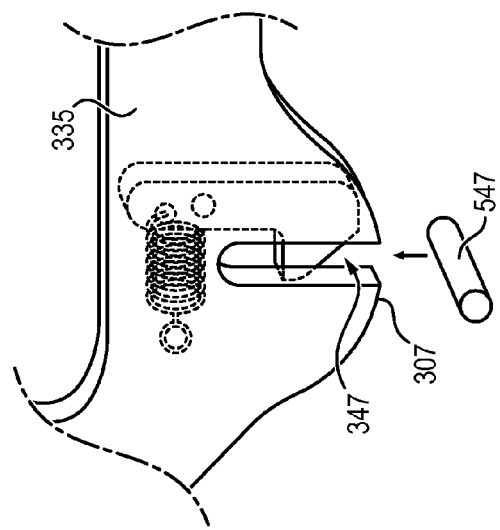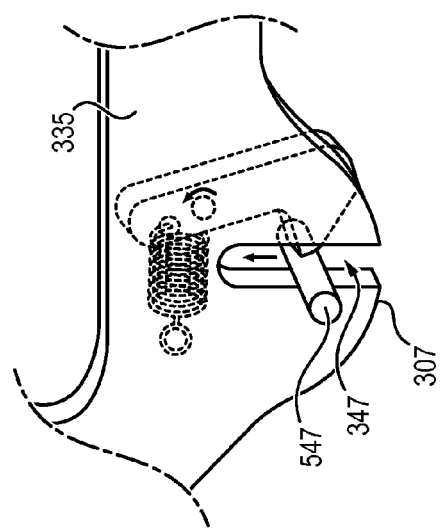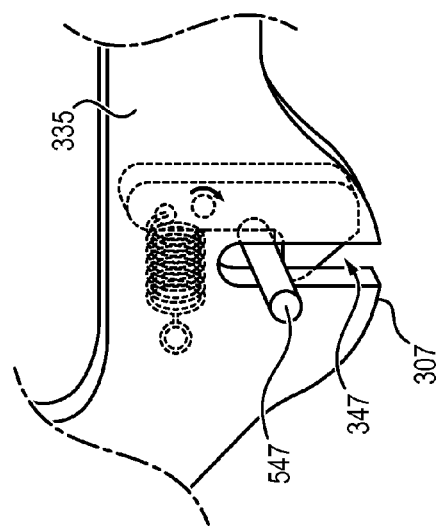

EXOSKELETON SUB-ASSEMBLY AND EXOSKELETON STRUCTURE INCLUDING SUCH A SUB-ASSEMBLY

CROSS REFERENCE TO RELATED APPLICATIONS

This application is a National Stage of International Application No. PCT/EP2017/084743 filed Dec. 28, 2017, claiming priority based on French Patent Application No. 1663510 filed Dec. 29, 2016, the entire contents of each of which are herein incorporated by reference in their entireties.

FIELD OF THE INVENTION

The invention relates to an exoskeleton sub-assembly and an exoskeleton structure including such a sub-assembly.

STATE OF THE ART

Force-assistance exoskeletons are mechanical structures positioned in parallel with the human skeleton and which allow improving the physical capabilities of the human body.

There are different types of exoskeletons, whose shape and structure depend on the tasks to be performed by the user. The two main types of exoskeletons are those intended to assist the movements of the user, on the one hand, and those intended to multiply the force capabilities of the user, on the other hand.

In the case of exoskeletons intended to assist the movements of the user, the user must generally transport the structure of the exoskeleton since it is disposed on his body, which has the consequence of limiting the freedom of movement of the user and generating an additional load and the fatigue associated thereto.

In order to relieve the user, exoskeleton structures are known, in which part of the mass of the exoskeleton is transferred to the ground via plates disposed below the feet of the user and connected to the rest of the structure.

In these structures, the feet of the user are not in contact with the ground, which makes the structure uncomfortable.

In addition, due to the presence of the plates, the mobility of the user is necessarily reduced. Moreover, in order to ensure a transfer of the mass of the exoskeleton to the ground, these structures generally do not fully allow a rotation of the user's foot, and particularly an internal/external rotational movement of the user's foot relative to his leg.

As a consequence, this type of structure does not provide support on the ground in all the walking phases and/or on all types of grounds, especially when the user walks on a sloping or an uneven ground.

SUMMARY OF THE INVENTION

An object of the invention is to propose a solution for relieving the user of the loads he carries, whether it is the load generated by the structure of the exoskeleton itself, by external elements that can be associated with the structure of the exoskeleton (for example a backpack) or the weight of the user if the latter is supported by the structure, while having better comfort and mobility.

This object is achieved within the scope of the present invention thanks to an exoskeleton sub-assembly comprising:

a leg portion adapted to be attached to a leg of a user, and a foot portion adapted to be attached to a shoe of the user, wherein the leg portion comprises a tibial segment extending below the knee, along the user's tibia, when the leg portion is attached to the leg, the tibial segment comprising a first part (or upper part), a second part (or lower part) connected to the foot portion, and a first joint connecting the second part to the first part, the first joint allowing a rotation of the second part relative to the first part caused by an internal/external rotational movement of the user's foot relative to the leg, and wherein the foot portion comprises an intermediate part connected to the second part of the leg portion, an attachment part adapted to be fastened to the user's shoe and a third joint connecting the intermediate part to the attachment part, the third joint allowing a rotation of the attachment part relative to the intermediate part caused by an eversion/inversion movement of the user's foot relative to the leg.

The invention is based on the observation that, in the human body, the internal/external rotational movement of the foot is not due solely to the contribution of the ankle, but also to the contributions of other joints, in particular those of the knee and hip.

Thus, in the proposed exoskeleton sub-assembly, the tibial segment that extends along the user's tibia is formed in two parts, the first joint being disposed between these two parts and allowing the internal/external rotational movement of the user's foot.

This disposition of the first joint between the user's knee and ankle allows the exoskeleton sub-assembly to accommodate the internal/external rotational movements of the user's foot, thereby improving comfort and mobility of the user.

In addition, the third joint allows the exoskeleton sub-assembly to accommodate the eversion/inversion movements of the user's foot, thus increasing the permitted degrees of freedom and also contributing to improving the comfort and mobility of the user.

The sub-assembly may further have the following characteristics:

- the sub-assembly comprises a second joint connecting the second part to the foot portion, the second joint allowing a rotation of the foot portion relative to the leg portion caused by a flexion/extension movement of the user's foot,
- the first joint allows a rotation of the second part relative to the first part about a first axis of rotation, and the second joint allows a rotation of the foot portion relative to the second part about a second axis of rotation, and the first axis of rotation and the second axis of rotation are orthogonal to each other,
- the attachment part comprises two fastening arms for fastening the attachment part on the shoe, the fastening arms allowing a flexion of the sole of the shoe along two non-parallel fold lines,
- the attachment part has slots in which fastening pins can be inserted for fastening the attachment part on the shoe.

The invention also relates to an exoskeleton structure comprising at least one exoskeleton sub-assembly as defined above.

PRESENTATION OF THE DRAWINGS

Figure 2:
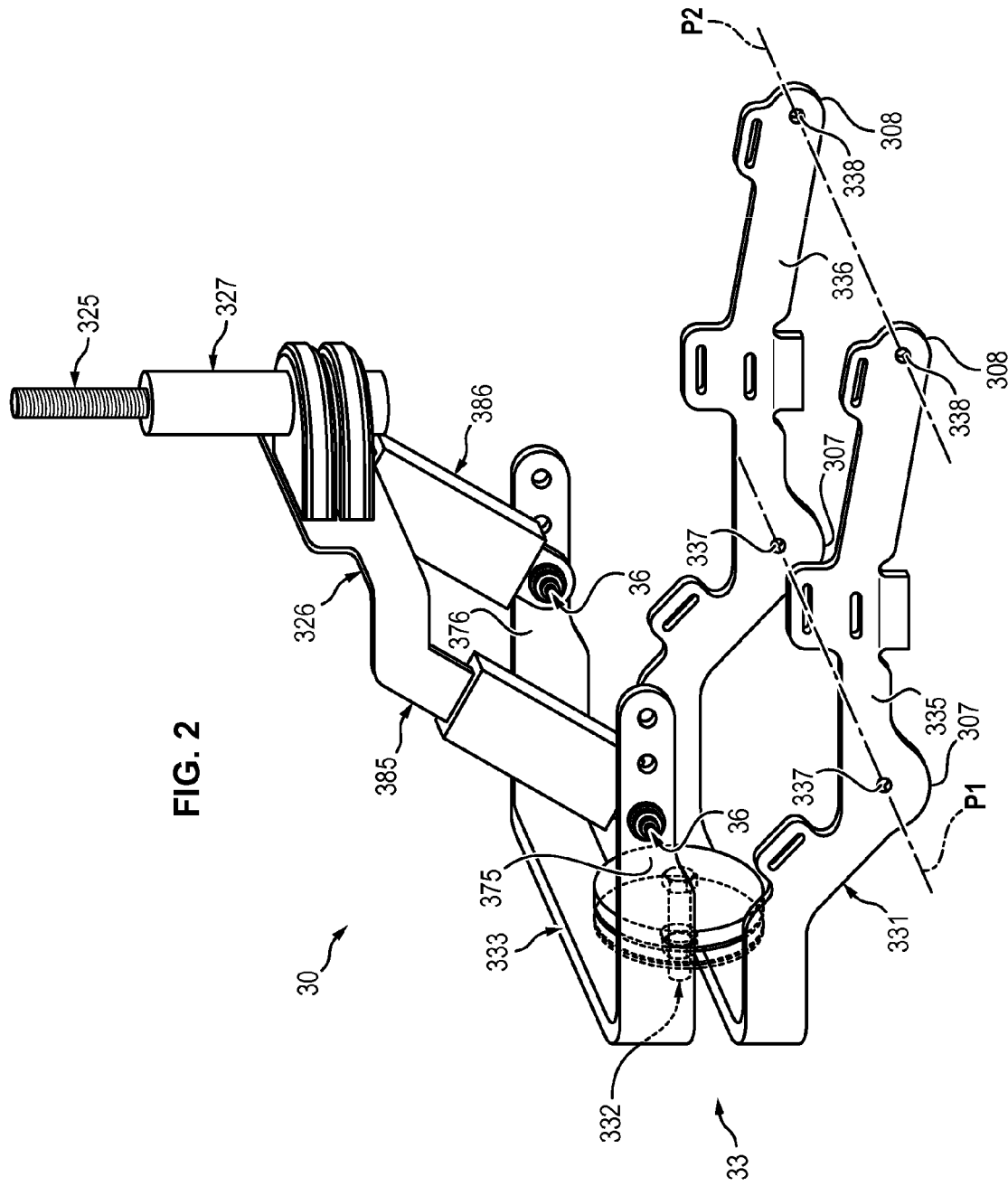
Figure 3:
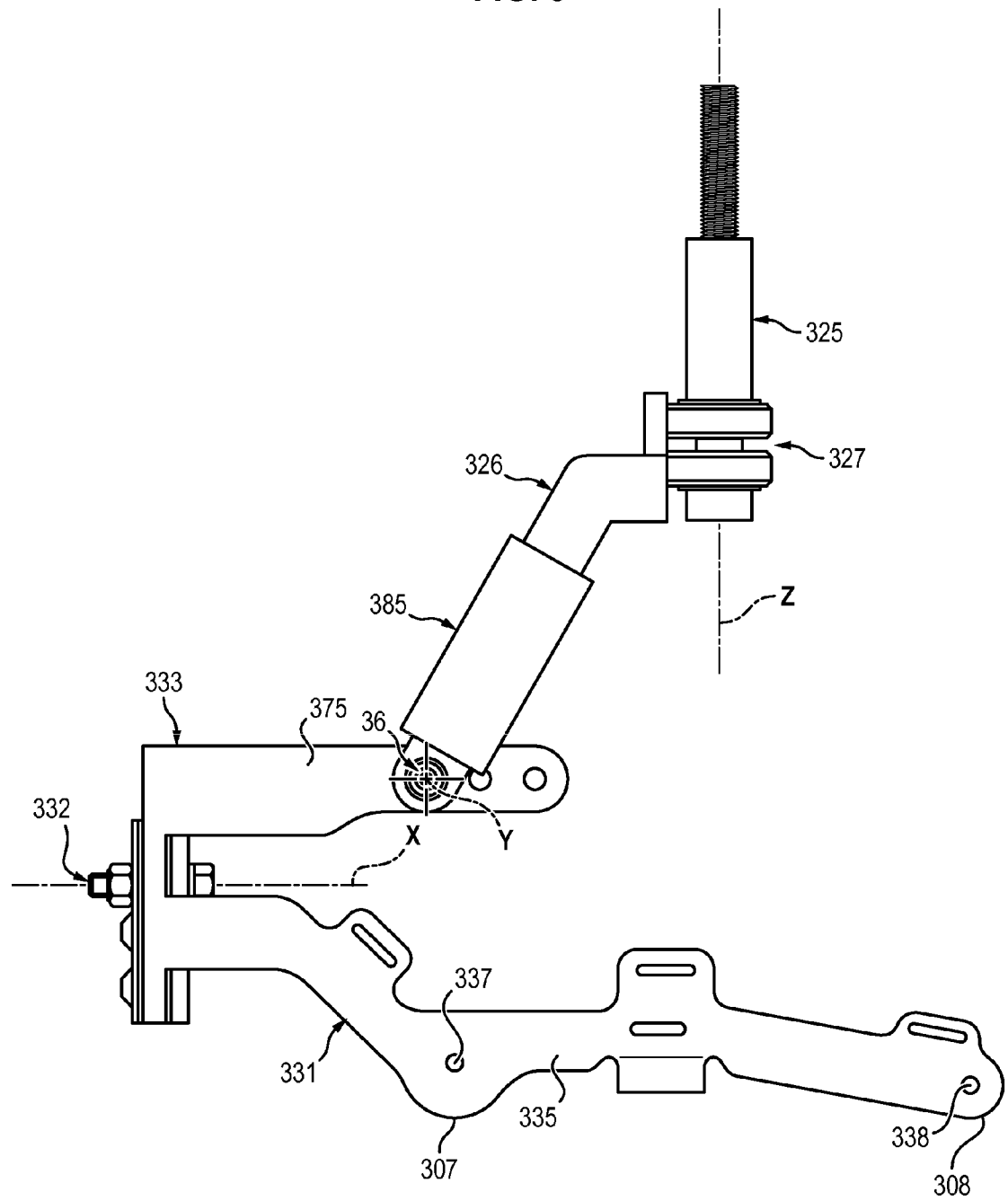
Figure 4:
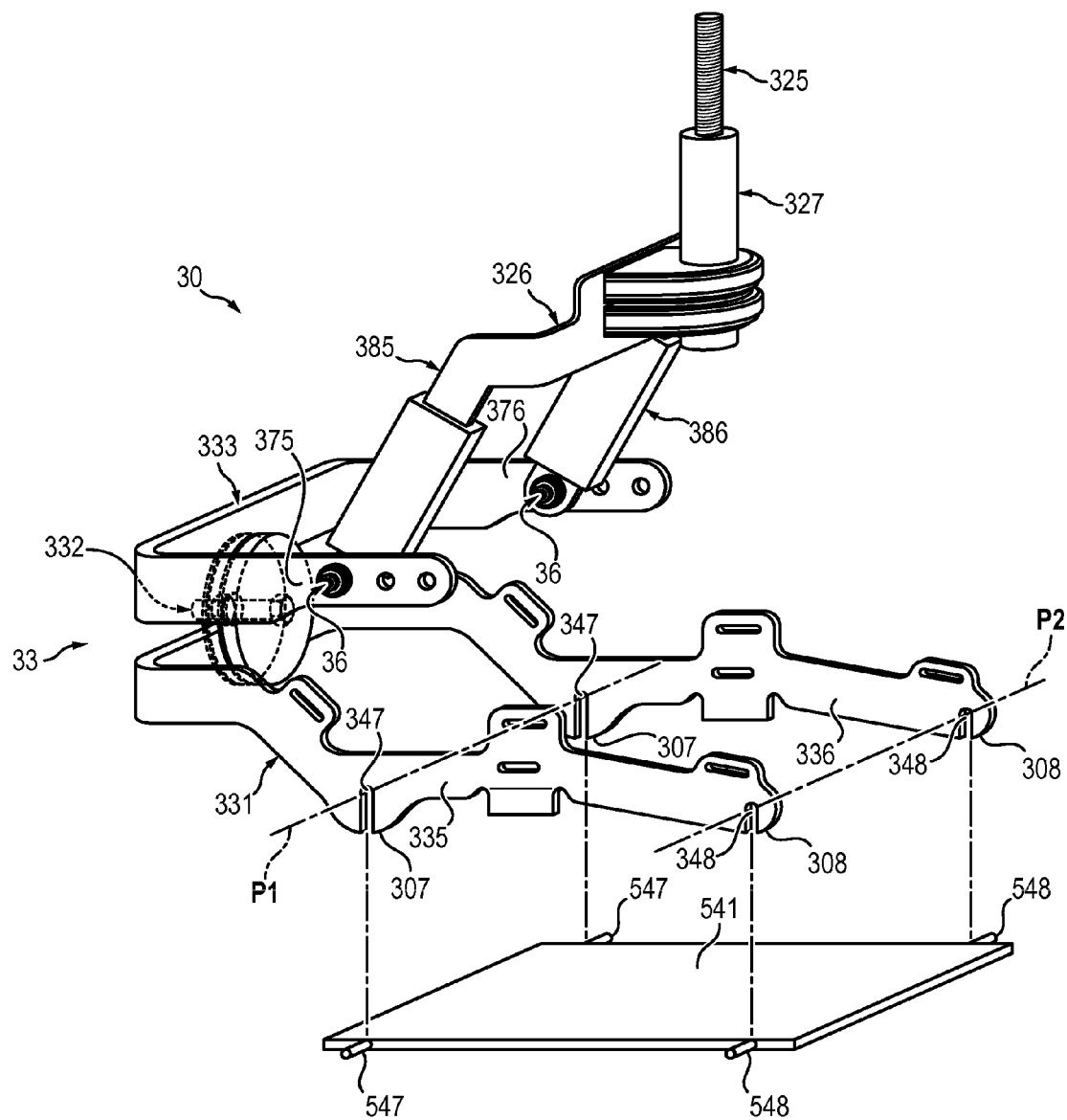

Other characteristics and advantages will become more apparent from the following description, which is purely illustrative and non-limiting and which should be read in relation to the appended figures, among which:

FIG. 1 schematically represents, in front view, a user equipped with an exoskeleton structure according to one embodiment of the invention, FIG. 2 schematically represents, in perspective, a sub-assembly of the exoskeleton structure of FIG. 1, FIG. 3 schematically represents, in side view, a sub-assembly of the exoskeleton structure of FIG. 1, FIG. 4 schematically represents, in perspective, a variant of the attachment part of the sub-assembly of the exoskeleton structure of FIG. 1, FIGS. 5A to 5C schematically represent a ratchet device for locking the attachment part on a shoe.

DETAILED DESCRIPTION OF ONE EMBODIMENT

In FIG. 1, the exoskeleton structure 1 represented comprises a waist belt 2, a first mechanical assembly 3 and a second mechanical assembly 4.

The waist belt 2 is adapted to surround the bottom of the user's trunk. The first mechanical assembly 3 is adapted to be connected to a first lower limb of the user (right lower limb) to assist the movement of the first lower limb when the user is walking or running. The second mechanical assembly 4 is adapted to be connected to a second lower limb of the user (left lower limb) to assist the movement of the second lower limb when the user is walking or running. The first mechanical assembly 3 and the second mechanical assembly 4 are each connected to the waist belt 2.

The first mechanical assembly 3 comprises a first thigh portion 31, a first leg portion 32 and a first foot portion 33.

The first thigh portion 31 comprises a first femoral segment 311 intended to extend along a first thigh (right thigh) of the user and fastening straps 312 adapted to surround the first thigh of the user to fasten the femoral segment 311 to the first thigh.

The first leg portion 32 comprises a first tibial segment 321 intended to extend along a first leg (right leg) of the user and fastening straps 322 adapted to surround the first leg of the user to fasten the tibial segment 321 to the first leg.

The first foot portion 33 is fastened to a first shoe 51 of the user, for example to a sole 511 of the first shoe 51. The first foot portion 33 can be fastened to the sole 511 by means of screws or by other suitable fastening means.

The first femoral segment 311 comprises a first end 313 connected to the waist belt 2 through a first hip joint 34 and a second end 314 connected to the first tibial segment 321 through a first knee joint 35.

The first tibial segment 321 comprises a first end 323 connected to the first femoral segment 311 by the first knee joint 35 and a second end 324 connected to the first foot portion 33 through a first ankle joint 36.

As can be seen in FIG. 1, the first tibial segment 321 is formed in two parts. The first tibial segment 321 comprises a first part 325 (or upper part), a second part 326 (or lower part) and a first joint 327 connecting the second part 326 to the first part 325. The first part 325 is connected to the first thigh portion 31 via the knee joint 35. The second part 326 is connected to the first foot portion 33 via the ankle joint 36. The first joint 327 connecting the second part 326 to the first part 325 is arranged to allow rotation of the second part 326 relative to the first part 325 caused by an internal/external rotational movement of the user's right foot relative to the right leg.

The second mechanical assembly 4 is symmetrical with the first mechanical assembly 3.

Thus, the second mechanical assembly 4 also comprises a second thigh portion 41, a second leg portion 42 and a second foot portion 43.

The second thigh portion 41 comprises a second femoral segment 411 intended to extend along a second thigh (left thigh) of the user and fastening straps 412 adapted to surround the second thigh of the user to fasten the femoral segment 411 to the second thigh.

The second leg portion 42 comprises a second tibial segment 421 intended to extend along a second leg (left leg) of the user and fastening straps 422 adapted to surround the second leg of the user to fasten the tibial segment 421 to the second leg.

The second foot portion 43 is fastened to a second shoe 52 of the user, for example to a sole 521 of the shoe 52. The second foot portion 43 can be fastened to the sole 521 by means of screws.

The second femoral segment 411 comprises a first end 413 connected to the waist belt 2 through a second hip joint 44 and a second end 414 connected to the second tibial segment 421 through a second knee joint 45.

The second tibial segment 421 comprises a first end 423 connected to the second femoral segment 411 by the second knee joint 45 and a second end 424 connected to the second foot portion 43 through a second ankle joint 46.

Like the first tibial segment 321, the second tibial segment 421 is also formed in two parts. The second tibial segment 421 comprises a first part 425 (or upper part), a second part 426 (or lower part) and a first joint 427 connecting the second part 426 to the first part 425. The first part 425 is connected to the second thigh portion 41 via the knee joint 45. The second part 426 is connected to the second leg portion via the ankle joint 46. The first joint 427 connecting the second part 426 to the first part 425 is arranged to allow a rotation of the second part 426 relative to the first part 425 caused by an internal/external rotational movement of the user's left foot relative to the left leg.

The hip joints 34, 44 and the knee joints 35, 45 may comprise actuators allowing to assist the user in a flexion or extension movement of the hip or knee.

FIGS. 2 and 3 represent in more detail a first exoskeleton sub-assembly 30 comprising the first leg portion 32, the first foot portion 33 and the first ankle joint 36, according to one embodiment of the invention.

It should be noted that the second exoskeleton sub-assembly 40 comprising the second leg portion 42, the second foot portion 43 and the second ankle joint 46 is symmetrical with the first exoskeleton sub-assembly 30. The second exoskeleton sub-assembly 40 is therefore formed of elements that are identical or similar to those of the first exoskeleton sub-assembly 30, and operates in the same manner as the first exoskeleton sub-assembly 30.

In FIGS. 2 and 3, the first foot portion 33 comprises an attachment part 331, a joint 332 and an intermediate part 333.

The attachment part 331 is intended to be fastened to the shoe 51 of the user. More specifically, the attachment part 331 is provided to be fastened to the sole 511 of the shoe 51. For this purpose, the attachment part 331 comprises two arms 335 and 336 disposed to extend respectively from one side to the other of the shoe 51, along the sole 511 of the shoe 51. Each arm 335, 336 has two fastening holes 337, 338 in which fastening members (for example screws) can be inserted to fasten the arm 335, 336 to the sole 511. The fastening holes 337 define first fastening points through which passes a first transverse fold line P1 of the sole 511 relative to the attachment part 331. Similarly, the holes 338 define second fastening points through which passes a second transverse fold line P2 of the sole 511 relative to the attachment part 331. Due to the disposition of the fastening points, the arms 335 and 336 allow a flexion of the sole 511 of the shoe 51 according to two fold lines P1 and P2 not parallel to each other. In addition, the fastening points corresponding to the fastening holes 337 are arranged so that the first fold line P1 extends below the heel of the user. The fastening points corresponding to the fastening holes 338 are arranged so that the second fold line P2 extends below the joints of the toes of the user. Thus, the sole 511 of the shoe is deformed by conforming to the movements of the foot of the user while he is walking. This makes it possible to avoid hindering the user's walking.

In addition, each arm 335, 336 has protruding portions 307 and 308 extending below the fastening holes 337 and 338, each portion 307, 308 being adapted to come into contact with the ground in order to limit crushing of the sole 511 at the points where the arms 335 and 336 are fastened to the sole 511.

The intermediate part 333 is connected to the attachment part 331 through the joint 332. The joint 332 is disposed at the rear of the shoe 51 of the user, behind the heel. The joint 332 allows a rotation of the attachment part 331 relative to the intermediate part 332 caused by an eversion/inversion movement of the foot relative to the leg of the user. In other words, the joint 332 allows a rotation of the attachment part 331 relative to the intermediate part 333 around an axis of rotation X parallel to an axis of eversion/inversion of the user's foot, when the tibial portion 32 is fastened to the leg and the foot portion 33 is fastened to the user's foot.

The joint 332 may consist of a connection assembly such as the one described in the French Patent Application No. 1657295 filed on Jul. 28, 2016.

In the embodiment illustrated in FIGS. 2 and 3, the intermediate part 333 is generally U-shaped. The intermediate part 333 comprises particularly two intermediate arms 375 376 extending respectively on either side of the shoe 51 of the user.

The second part 326 of the tibial segment 32 is also generally U-shaped. The second part 326 comprises particularly two connection arms 385 and 386, each connection arm 385, 386 being respectively connected to one of the intermediate arms 375, 376 of the intermediate part 333 through an ankle joint 36.

The ankle joints 36 allow a rotation of the intermediate part 333 relative to the second part 326 of the tibial segment 32 caused by a flexion/extension movement of the foot relative to the leg. In other words, the ankle joints 36 allow a rotation of the intermediate part 333 relative to the second part 326 about an axis of rotation Y parallel to an axis of flexion/extension of the user's foot, when the tibial portion 32 is fastened to the leg and the foot portion 33 is fastened to the shoe 51 of the user.

Each ankle joint 36 may consist of a connection assembly such as the one described in the French Patent Application No. 1657295 filed in Jul. 28, 2016.

It should be noted that each arm 385, 386 of the second part 326 can itself be formed in two parts, a part of which is slidable relative to the other part so as to allow an adjustment of the height and depth of the joint 327 relative to the ankle joint 36. This also makes it possible to quickly separate the foot portion 33 attached to the shoe 51 from the rest of the exoskeleton structure 1. The user can thus keep his shoes 51 and 52, after having removed the rest of the exoskeleton structure.

Finally, the second part 326 of the tibial segment 32 is connected to the first part 325 of the tibial segment 32 through the joint 327. The joint 327 is disposed in front of the leg of the user when the tibial portion 32 is fastened to the leg and the foot portion 33 is fastened to the shoe 51 of the user. The joint 327 allows a rotation of the second part 326 relative to the first part 325 about an axis of rotation Z which is parallel to an internal/external rotational axis of the user's foot (substantially vertical direction when the user is in a standing position).

Furthermore, the axis of rotation Z of the joint 327 is orthogonal with the axis of rotation Y of the ankle joints 36. The joint 327 can be oriented so that the axis of rotation Z is concurrent with the axis of rotation Y of the ankle joints 36. This means that the axis of rotation Z intersects the axis of rotation Y.

The sub-assembly 30 illustrated in FIGS. 2 and 3 thus allows a rotation of the right foot of the user relative to the right leg in three degrees of freedom.

The disposition of the axes of rotation X, Y and Z allows the exoskeleton sub-assembly to accommodate the movements of the user's foot, thereby improving the comfort and mobility of the user.

Similarly, the sub-assembly 40 allows a rotation of the left foot of the user relative to the left leg in three degrees of freedom.

Moreover, the disposition of the pivots 36 on either side of the user's ankle makes it possible to balance the load applied to the pivot 332 located behind the heel of the user.

FIG. 4 schematically represents one variant of the attachment part 331.

In this embodiment, the sole 511 of the shoe 51 is provided with a fastening plate 541. The fastening plate 541 can be embedded in the sole of the shoe 51. The fastening plate 541 has fastening pins 547, 548 extending from the lateral edges of the plate 541 and protruding from one side to the other of the sole.

Each arm 335, 336 of the attachment part 331 has two fastening slots 347, 348 in which fastening pins 547, 548 can be inserted vertically to fasten the arm 335, 336 to the sole 511.

Each fastening slot 347 and 348 may be provided with a ratchet device for locking the fastening pins 547, 548 in the fastening slots 347, 348. FIGS. 5A to 5C schematically illustrate an exemplary ratchet device with a hook and a spring, for locking a fastening pin 547 in a fastening slot 347.

The fastening slots 347, 348 and the fastening pins 547, 548, as well as the possible ratchet devices, allow quick attachment and detachment of the foot portion 33 to the shoe 51.

The invention claimed is:

1. An exoskeleton subassembly comprising:
   a leg portion adapted to be attached to a leg of a user, and
   a foot portion adapted to be attached to a shoe of the user,
   wherein the leg portion comprises a tibial segment
      extending below a knee, along a tibia of the user, when the leg portion is attached to the leg, the tibial segment comprising a first part, a second part connected to the foot portion, and a first joint connecting the second part to the first part, the first joint allowing a rotation of the second part relative to the first part caused by an internal/external rotational movement of a foot of the user relative to the leg, and wherein the foot portion comprises an intermediate part connected to the second part of the leg portion, an attachment part adapted to be fastened to the shoe of the user and a third joint connecting the intermediate part to the attachment part, the third joint allowing a rotation of the attachment part relative to the intermediate part caused by an eversion/inversion movement of the foot of the user relative to the leg, and wherein the third joint is disposed at a rear of the shoe of the user, behind a heel, when the leg portion is attached to the leg of the user and the foot portion is attached to the shoe of the user.

2. The exoskeleton sub-assembly according to claim 1, comprising a second joint connecting the second part to the foot portion, the second joint allowing a rotation of the foot portion relative to the leg portion caused by a flexion/extension movement of the foot of the user relative to the leg.

3. The exoskeleton sub-assembly according to claim 2, wherein the first joint allows the rotation of the second part relative to the first part about a first axis of rotation, and the second joint allows the rotation of the foot portion relative to the second part about a second axis of rotation, and the first axis of rotation and the second axis of rotation are orthogonal to each other.

4. The exoskeleton sub-assembly according to claim 1, wherein the attachment part comprises two fastening arms for fastening the attachment part on the shoe, the two fastening arms allowing a flexion of a sole of the shoe along two non-parallel fold lines.

5. The exoskeleton sub-assembly according to claim 1, wherein the attachment part has slots in which fastening pins can be inserted for fastening the attachment part on the shoe.

6. An exoskeleton structure comprising at least one exoskeleton sub-assembly according to claim 1.

* * * * *